(12) United States Patent
Kellner et al.

(10) Patent No.: US 11,090,878 B2
(45) Date of Patent: Aug. 17, 2021

(54) METHOD FOR PRODUCING A COMPOSITE COMPONENT FOR A MOTOR VEHICLE

(71) Applicant: Dr. Ing. h.c. F. Porsche Aktiengesellschaft, Stuttgart (DE)

(72) Inventors: Philipp Kellner, Renningen (DE); Philipp Knothe, Oberursel (DE); Tobias Bongards, Ludwigsburg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 3 days.

(21) Appl. No.: 16/271,994

(22) Filed: Feb. 11, 2019

(65) Prior Publication Data
US 2019/0168462 A1 Jun. 6, 2019

Related U.S. Application Data

(62) Division of application No. 15/728,520, filed on Oct. 10, 2017, now Pat. No. 10,556,385.

(30) Foreign Application Priority Data
Oct. 25, 2016 (DE) ................ DE10 2016 120 355.6

(51) Int. Cl.
*B29C 65/00* (2006.01)
*B22F 10/20* (2021.01)
(Continued)

(52) U.S. Cl.
CPC ........ *B29C 66/30321* (2013.01); *B22F 10/20* (2021.01); *B29C 64/10* (2017.08);
(Continued)

(58) Field of Classification Search
CPC ....... B29C 64/10; B29C 65/56; B29C 65/561; B29C 65/562; B29C 65/564;
(Continued)

(56) References Cited

U.S. PATENT DOCUMENTS

2005/0042023 A1* 2/2005 Jones ..................... B29C 65/76
403/267
2008/0003401 A1 1/2008 Barnes et al.
(Continued)

FOREIGN PATENT DOCUMENTS

DE 102008061166 A1 7/2010
DE 102009017776 A1 10/2010
(Continued)

OTHER PUBLICATIONS

Machine translation of WO 96/15899 date unknown.*
Machine translation of EP 2962834 date unknown.*
U.S. Appl. No. 15/728,520, filed Oct. 10, 2017.

*Primary Examiner* — John L Goff, II
(74) *Attorney, Agent, or Firm* — Leydig, Voit & Mayer, Ltd.

(57) ABSTRACT

A method for producing a composite component, which has a first section and a second section connected to the first section, the first section including a metallic material, the second section including a plastic, the first section having a first base region and projections provided on the first base region, and the projections provided on the first base region being anchored in the second section in order to bring about the connection between the first section and the second section, includes: manufacturing the first base region of the first section; creating the projections directly on the first base region by way of an additive manufacturing method; and connecting the second section to the first section.

18 Claims, 3 Drawing Sheets

(51) Int. Cl.
*B33Y 10/00* (2015.01)
*B29C 64/10* (2017.01)
*B29C 65/02* (2006.01)
*B62D 29/00* (2006.01)
B29L 31/30 (2006.01)
B22F 7/06 (2006.01)
B33Y 80/00 (2015.01)

(52) U.S. Cl.
CPC .......... *B29C 65/02* (2013.01); *B29C 66/1122* (2013.01); *B29C 66/742* (2013.01); *B33Y 10/00* (2014.12); *B62D 29/005* (2013.01); B22F 7/062 (2013.01); B29C 66/71 (2013.01); B29C 66/721 (2013.01); B29C 66/72141 (2013.01); B29C 66/72143 (2013.01); B29C 66/7392 (2013.01); B29C 66/7394 (2013.01); B29C 66/7422 (2013.01); B29C 66/7428 (2013.01); B29L 2031/3002 (2013.01); B29L 2031/3055 (2013.01); B33Y 80/00 (2014.12)

(58) Field of Classification Search
CPC . B29C 65/565; B29C 65/64; B29C 66/30321; B29C 66/742; B29C 66/7422; B29C 66/7428; B29C 65/44; B29C 65/02; B29C 66/1122; B29C 37/0082; B29C 45/14; B29C 45/14008; B29C 66/71; B33Y 10/00; B62D 29/005; B22F 3/1055; B29L 2031/3002

See application file for complete search history.

(56) References Cited

U.S. PATENT DOCUMENTS

| 2013/0149501 | A1* | 6/2013 | Pacchione | B29C 65/5057 |
| | | | | 428/172 |
| 2014/0161520 | A1* | 6/2014 | Clark | B22F 7/062 |
| | | | | 403/381 |
| 2015/0219133 | A1 | 8/2015 | Meyer et al. | |
| 2016/0053788 | A1* | 2/2016 | Iwano | B29C 70/12 |
| | | | | 403/268 |

FOREIGN PATENT DOCUMENTS

| DE | 102011104398 A1 | 12/2012 | |
| EP | 2962834 A1 * | 1/2016 | ........... B29C 66/131 |
| WO | WO-9615899 A1 * | 5/1996 | ......... B29C 65/5007 |

* cited by examiner

METHOD FOR PRODUCING A COMPOSITE COMPONENT FOR A MOTOR VEHICLE

CROSS REFERENCE TO RELATED APPLICATIONS

This application is a divisional patent application of U.S. patent application Ser. No. 15/728,520, filed on Oct. 10, 2017, now U.S. Pat. No. 10,556,385, which claims benefit to German Patent Application No. DE 10 2016 120 355.6, filed Oct. 25, 2016, the entirety of each of which are hereby incorporated by reference herein.

FIELD

The invention relates to a method for producing a composite component, in particular a composite component for a motor vehicle.

BACKGROUND

Composite components having a plastic portion and a metal portion are used for example to provide a plastic on the surface of a motor vehicle but at the same time to ensure good stability of the composite component by way of a metal portion.

Such composite components are used for example as an A pillar, as a B pillar or as a roof crossmember in bodywork construction, and they are fitted as mounting components as part of a battery supporting structure, as a seat component or as a rollover bar. Other areas of use such as bench seats are also possible.

A connection between a plastic and a metal can be achieved in various ways, for example: creation of a material bond (adhesive bond) by means of a bonding agent, creation of a macroscopic form fit by means of through-moldings, creation of a friction fit by shrink-fitting, and creation of a microscopic form fit by structuring of the surface.

DE 10 2011 104 398 A1 shows a composite component for a motor vehicle with a metal carrier part which is provided in a connection region with a plastic, wherein provided in the connection region is a separate connection element which is connected to the metal carrier part in a force-fitting manner. The connection element allows a form fit with the plastic, with the result that said plastic is reliably connected to the metal carrier part. A clamping element, which surrounds the metal carrier part on the outside, is shown as the connection element.

DE 10 2008 061 166 A1 shows a composite component with a metallic part and with a polymeric part. The metallic part is protected against corrosion by zinc phosphating, which also results in a roughened surface structure. This improves the bonding of the polymeric coating that is subsequently applied.

SUMMARY

In an embodiment, the present invention provides a method for producing a composite component. The composite component has a first section and a second section connected to the first section. The first section includes a metallic material and the second section includes a plastic. The first section has a first base region and projections provided on the first base region, and the projections provided on the first base region are anchored in the second section in order to bring about the connection between the first section and the second section. The method includes: manufacturing the first base region of the first section; creating the projections directly on the first base region by way of an additive manufacturing method; and connecting the second section to the first section.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
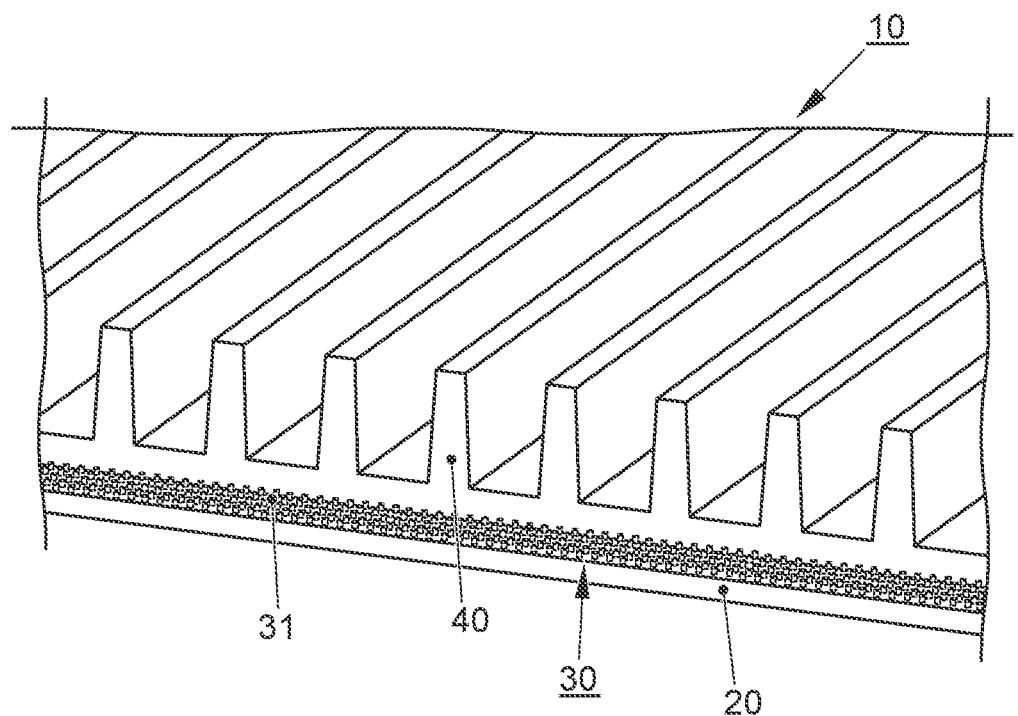
FIG. 1 shows, in a perspective illustration, a composite component with a plastic/metal connection.

Embodiments of the invention provide new composite components. Composite components provided by various embodiments of the invention can provide for an improvement of the connection strength between a metal portion and a plastic portion, good sealing of the connection and, in comparison with other components having additional connection elements, a lower weight. Although composite components for which structuring of the surface has been performed by chemical etching or sand blasting also have a larger surface, they have no or only very few undercuts and therefore provide a poorer connection.

According to a preferred embodiment, the first base region defines a first base area, and the projections form a structuring of the first base area. This makes a good connection possible. The projections are produced in particular by means of additive manufacturing.

According to a preferred embodiment, the second section has a second base region and ribs provided on the second base region. This leads to a lightweight design.

According to a preferred embodiment, the ribs have a free end, and the projections are anchored in the free end. This results in channels, which may serve in particular for transporting a fluid between the first section and the second section, and a relatively large volume of the composite component.

According to a preferred embodiment, the second section comprises a thermoplastic, a thermosetting plastic or an elastomeric plastic. With these plastics, a good connection to the projections is achievable.

According to a preferred embodiment, the second section comprises a fiber-reinforced plastic, in particular a short-fiber-reinforced plastic, a long-fiber-reinforced plastic or a continuous-fiber-reinforced plastic. A very stable composite component is thus obtained, and in particular the connection at the projections is positively influenced by locking of the fibers.

According to a preferred embodiment, the first section comprises aluminum, magnesium, titanium or an alloy with one or more of these metals or steel. Depending on the material, light and also stable composite components are possible here.

According to a preferred embodiment, the projections comprise aluminum, magnesium, titanium or an alloy with one or more of these metals or steel. These materials are also highly suitable for the projections.

According to a preferred embodiment, the projections are formed from the same metallic material as the first base region. This facilitates recycling, and formation of galvanic cells is prevented.

According to a preferred embodiment, the projections are formed integrally with the first base region in the connection region between the projections and the first base region. This configuration allows simple production and high strength.

According to a preferred embodiment, at least some of the projections have a maximum extent from the first base region into the second section, which maximum extent lies in the range from 10 µm to 2000 µm. This maximum extent is sufficient for a good connection, and, as a result of the small maximum extent, the projections weigh less.

Embodiments of the invention further include methods that allow for a composite component to be produced in a low-cost manner and that are suitable for series production.

In the various figures, parts that are the same or have the same effect are denoted by the same reference signs and are generally described only once. This also applies to the properties associated with the parts.

Figure 2:
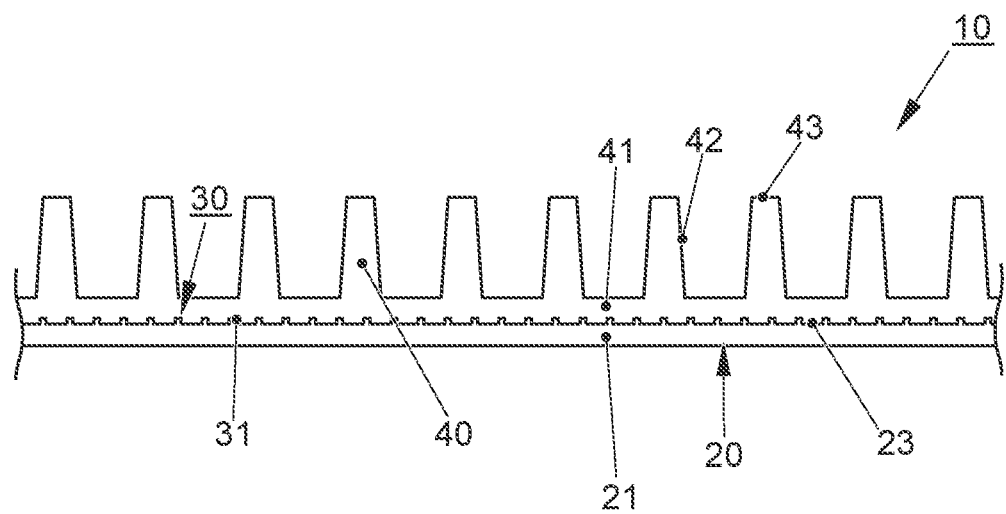
FIG. 2 shows, in a cross section, the composite component of FIG. 1.

FIG. 1 and FIG. 2 show a composite component 10, in particular for a motor vehicle. The composite component 10 has a first section 20 and a second section 40 connected to the first section 20. The first section 20 comprises a metallic material, in particular aluminum, magnesium, titanium or an alloy with one or more of these metals, steel or some other alloy, it preferably consisting of this material. The second section 40 comprises a plastic, in particular a thermoplastic, a thermosetting plastic or an elastomer. The use of a thermoplastic has resulted in a particularly good connection. For particularly highly stressed composite components 10, a fiber-reinforced plastic can be used, wherein short fibers, long fibers, continuous fibers or combinations of these fibers result in good stability.

The first section 20 has a first base region 21, and projections 31 are provided on the first base region 21. The projections 31 extend from the first base region 21 to the second section 40.

The projections 31 are anchored in the second section 40, and they can thus bring about a good connection between the first section 20 and the second section 40.

The first base region 21 defines a first base area 23, and the projections 31 form a structuring 30 of the first base area 23. Here, the first base area 23 may be flat, but it may also be curved or have edges in order to allow adaptation to the region into which the composite component 10 is inserted.

Since the projections 31 extend away from the base area 23, it is possible to speak of an additive structure or a structure produced by way of additive manufacturing. By contrast, in the case of a structuring of the surface 23 by way of an etching process or by way of some other method for producing cavities, a subtractive manufacturing method is spoken of.

In the present exemplary embodiment, the second section 40 has a second base region 41 on which ribs 42 are provided. The ribs 42 have a free end 43. The second base region 41 is connected to the first section 20 such that the ribs 42 are directed away from the first section 20.

The projections 31 preferably comprise aluminum, magnesium, titanium or an alloy with one or more of these metals, steel or some other alloy, these preferably consisting of this material. The projections 31 and the first base region 21 are preferably formed from the same material.

The projections 31 are not necessarily depicted to scale in the figures.

For a good connection between the first section 20 and the second section 40, at least 100 projections 31 are preferably provided. This applies to all the exemplary embodiments.

Figure 3:
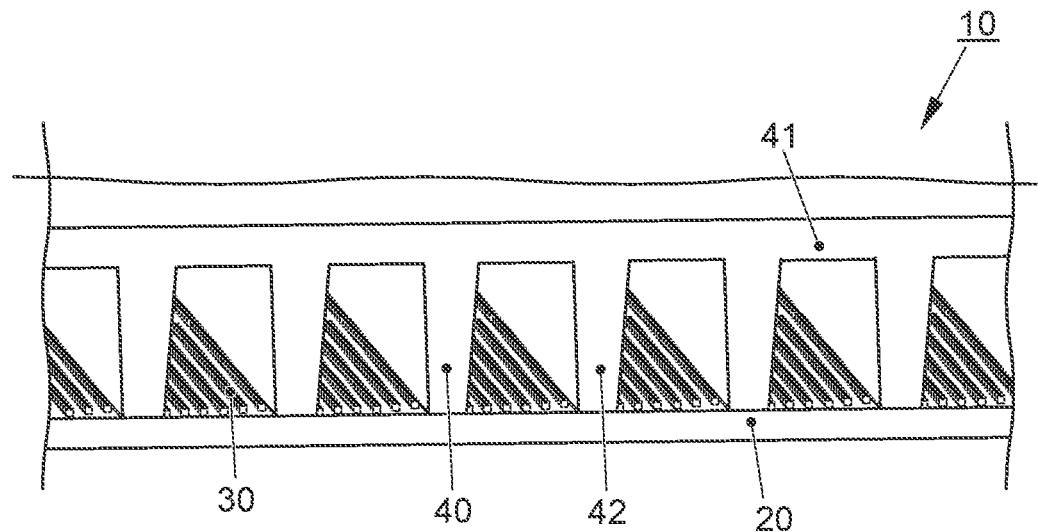
FIG. 3 shows, in a perspective illustration, a further embodiment of a composite component.
Figure 4:
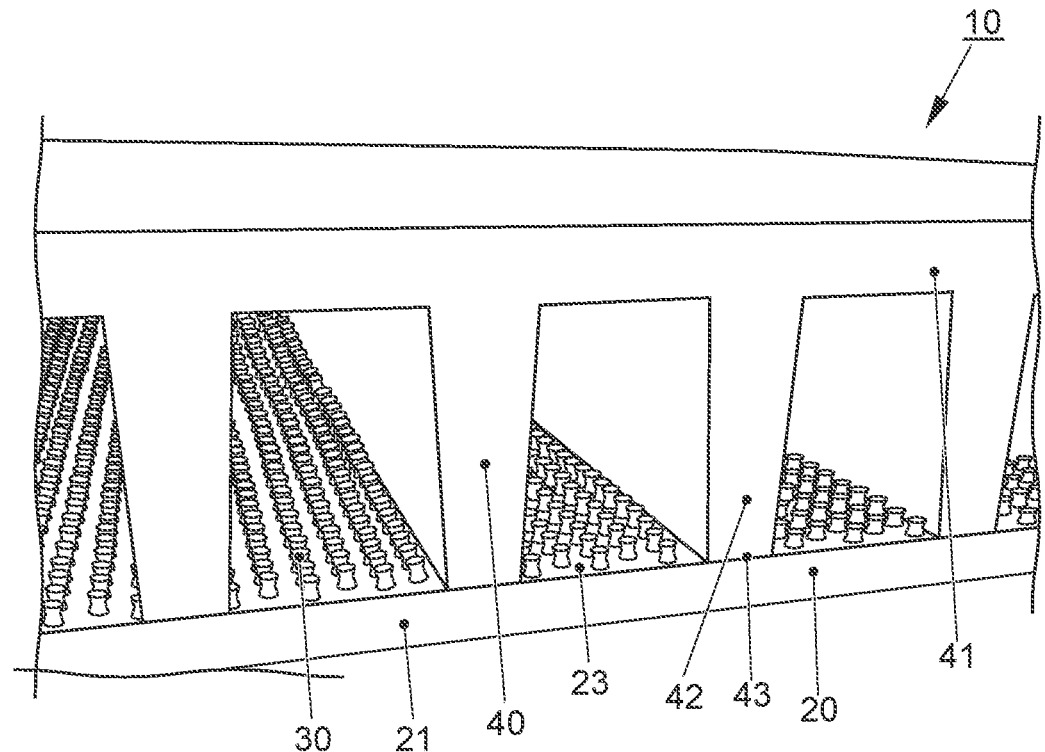
FIG. 4 shows a detailed illustration of FIG. 3.

FIG. 3 shows a further embodiment of the composite component 10, and FIG. 4 shows a detailed view of FIG. 3. Unlike in the exemplary embodiment of FIG. 1 and FIG. 2, the ends 43 of the ribs 42, which in view of the second section 40 may be referred to as free ends 43, point toward the first section 20, and the projections 31 are anchored in the free ends 43.

This results in channels between the ribs 42, through which channels air or a liquid, for example, can flow. As a result, cooling or heating, for example, can be performed.

Figure 5:
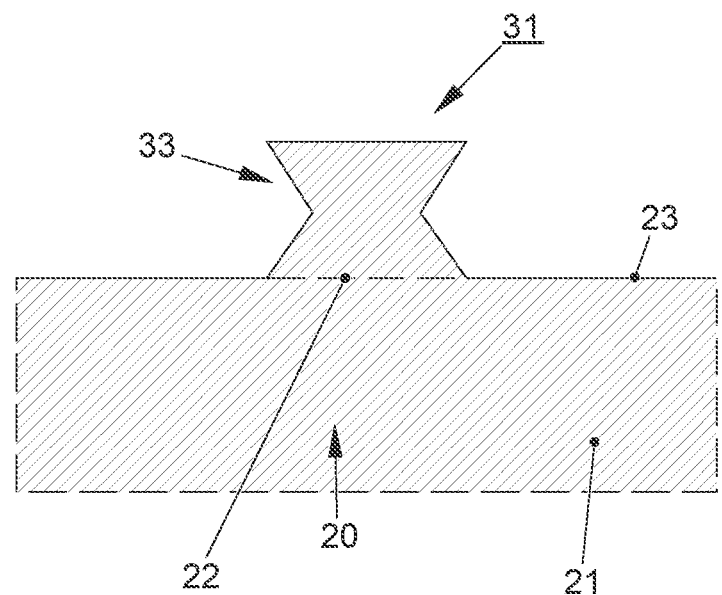
FIG. 5 shows a detailed illustration of a metallic section of a composite component.

FIG. 5 shows the first section 20 as it is formed in FIG. 1 to FIG. 4. The projection 31 projects away from the base area 23, upwardly in the orientation shown, and an undercut 33 is provided. The projection 31 thus extends laterally further outward in a region that is further away from the base area 23 than in a region that is provided closer to the base area 23. Such an undercut 33 improves the connection between the first section 20 and the second section 40 since the plastic of the second section 40 is able to lock itself in the undercut 33.

In FIG. 5, the projection 31 has a maximum extent from the first base region 21 into the second section, which extends from the connection region 22 (depicted line) to the upper end.

In the region of the base area 23 in which projections 31 are provided, firstly it is possible to consider the area of the projections 31 at the height of the first base area 23, that is to say the area which is identified by the dashed line of the connection region 22 in the two-dimensional illustration of FIG. 5, wherein the areas of all the projections 31 in this region of the base area are added together. Secondly it is possible there to consider the entire base area 23, which also includes the previously defined area of the projections 31.

Thus, regions of the base area 23 in which no projections 31 at all are provided, that is to say for example in regions in which no connection is provided, are omitted from this consideration.

Figure 6:
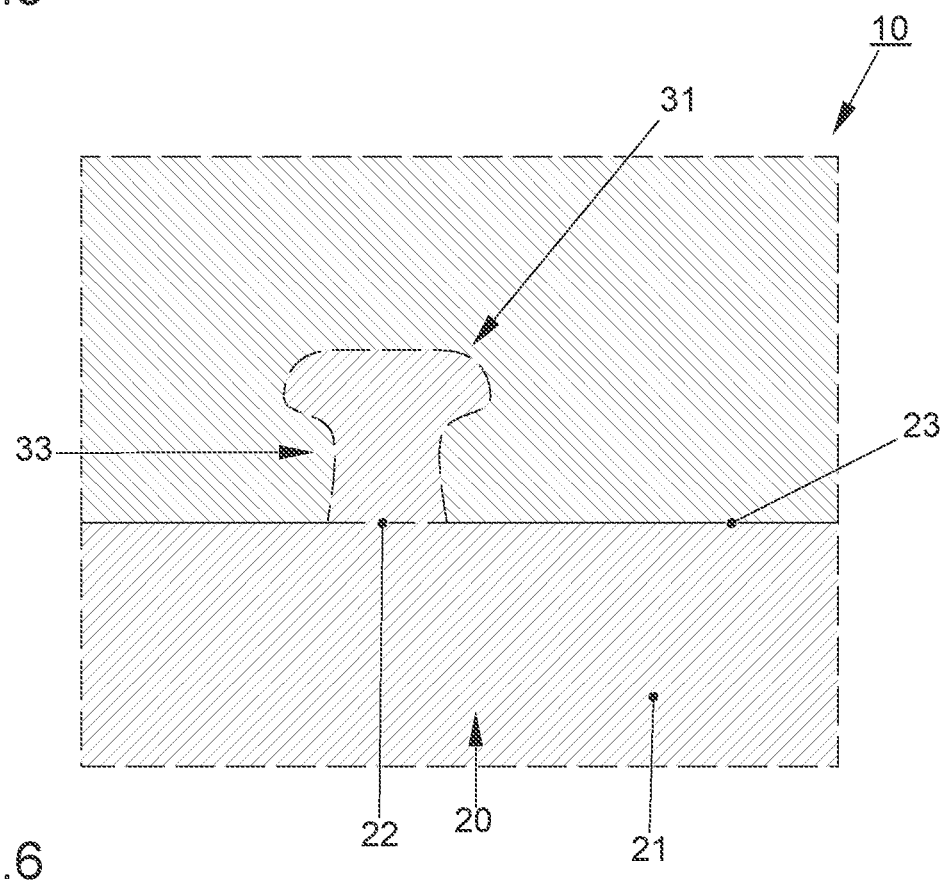
FIG. 6 shows a detailed illustration of a composite component.

FIG. 6 shows a further exemplary embodiment of a projection 31. The projection 31 has the form of a mushroom head, it thus extending upwardly from the base area 23 in a stem-like manner and widening in the upper region. Consequently, an undercut 33 is likewise formed, and the plastic of the second section 40 is able to enclose the projection 31.

A production method for such a composite component 10 is described in the following text. In a first step A), the first base region 21 of the first section 20 is manufactured. Said section does not yet have the finished projections 31. In a second step B), the projections 31 are created directly on the base region 21 by way of an additive manufacturing method. Examples of such additive manufacturing methods are laser deposition welding, metal powder deposition welding and selective laser sintering. The projections 31 may as it were be printed on. In a third step C), the second section 40 is connected to the first section 20. This may be performed in various ways.

A first possibility is that, in step C), the first section 20 is positioned in a tool for manufacturing the second section 40, and the second section 40 is produced in the tool on the first section 20 by primary forming. The first section 20 may for example be inserted as an insert into an injection mold, and the second section 40 is then formed directly on the first section in a primary and/or secondary forming manner by way of an injection-molding method, with the result that, during the injection-molding process, the plastic of the second section 40 flows directly around the projections 31 into the injection mold, where it cools down. The primary forming and/or secondary forming of the second section 40 and the joining to the first section 20 are thus realized simultaneously. Alternatives to the injection-molding method are a resin transfer moulding (RTM) process, a wet-pressing process, a thermoforming process, extrusion process. The first possibility is in particular advantageous in the case of a full-area connection between the first section 20 and the second section 40, as this is shown for example in FIG. 1 and FIG. 2.

A second possibility is that, prior to the joining to the first section 20, the second section 40 is manufactured, for example by way of a thermoforming process, extrusion process or injection-molding process, and then, in step C), the second section 40 is connected to the first section 20 by way of a pressing process. The second section 40 and the first section 20 are thus pressed together. Preferably, prior to the pressing process, the first section 20 or the second section 40 or both the first section 20 and the second section 40 are heated at least regionally in order to bring about melting of the material of the second section 40 in the region of the connection. This causes the material of the second section 40 to flow around the projections 31, and, as a consequence of this, the material also passes into the region of the undercuts 33 and locks itself on them. It is possible, for example, for the surface of the second section 40 that is to be connected to the first section 20 to be melted prior to the pressing process, or for the first section 20 to be heated, preferably to a temperature above the melting temperature of the second section 40, such that, during the pressing process, melting of the second section 40 by the first section 20 occurs and brings about a good contact between the first section 20 and the second section 40. A further supply of heat during the pressing process is positive in order to bring about good filling of the cavities in the region of the first section 20 with the material of the second section 40. The second possibility is advantageous in particular in the case of a connection between the first section 20 and the second section 40 in which connections are provided only regionally, as this is shown for example in FIG. 3 and FIG. 4.

The composite component 10 may subsequently be removed.

Preferably, the structuring with the projections 31 is applied only in the regions in which a connection between the first section 20 and the second section 40 is intended. As a result, costs and also weight can be saved. This is advantageous in particular in the case of the production variant in which the second section 40 is produced before being connected to the first section 20.

In the drawings, the projections 31 are of punctiform design. An elongate design is also possible, however, for example in the form of ribs which have undercuts.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for producing a composite component having a first section and a second section connected to the first section, wherein the first section comprises a first metallic material, wherein the second section comprises a plastic, wherein the first section has a first base region and projections provided on the first base region, and wherein the projections provided on the first base region are anchored in the second section in order to bring about the connection between the first section and the second section, the method comprising:

manufacturing the first base region of the first section using the first metallic material;

forming the projections with undercuts directly on the first base region by way of an additive manufacturing method using a second metallic material, such that an uppermost lateral surface of each of the projections extends laterally further outward than a respective lower region of each of the projections, the uppermost lateral surface being further away from the first base region than the lower region; and connecting the second section to the first section, the second section including a second base region and a plurality of ribs extending from the second base region toward the first section, each of the ribs having a free end opposite the second base region, wherein the operation of connecting the second section to the first section comprises anchoring a plurality of the projections in the respective free end of the plurality of the ribs, and wherein the second section forms a plurality of channels, each of the channels being formed between a respective pair of adjacent ribs and extending between the first base region and the second base region, and wherein each of the channels extends from a first end of the second base region to a second end of the second base region, opposite the first end, the channels being parallel to each other.

2. The method as claimed in claim 1, wherein the connecting the second section to the first section comprises positioning the first section in a tool for manufacturing the second section, and producing the second section in the tool on the first section by primary forming or secondary forming.

3. The method as claimed in claim 1, wherein the second section is manufactured, and then, wherein the connecting the second section to the first section comprises connecting the second section to the first section by way of a pressing process.

4. The method as claimed in claim 3, wherein prior to the pressing process, the first section or the second section or both the first section and the second section are heated at least regionally in order to bring about melting of the material of the second section in a region of the connection to the first section.

5. The method as claimed in claim 1, wherein the additive manufacturing method comprises laser deposition welding, metal powder deposition welding, or selective laser sintering.

6. The method as claimed in claim 2,
wherein the positioning of the first section in the tool comprises inserting the first section as an insert into an injection mold,
wherein the producing the second section in the tool comprises forming the second section directly on the first section using injection molding such that the plastic of the second section flows directly around a plurality of the projections into the injection mold, where the plastic cools.

7. The method as claimed in claim 2, wherein the operation of connecting the second section to the first section is performed simultaneously with the operation of producing the second section.

8. The method as claimed in claim 2, wherein the connecting operation and the operation of producing the second section comprises a resin transfer molding process, a wet-processing process, a thermoforming process, or an extrusion process.

9. The method as claimed in claim 3, wherein the manufacturing of the second section comprises a thermoforming process, an extrusion process, or an injection molding process.

10. The method as claimed in claim 4, the method further comprising heating the first section or the second section during the pressing process.

11. The method as claimed in claim 1, wherein the second section comprises a thermoplastic, a thermosetting plastic, or an elastomeric plastic.

12. The method as claimed in claim 1, wherein the second section comprises a fiber-reinforced plastic.

13. The method as claimed in claim 1, wherein the first section comprises aluminum, magnesium, titanium, or an alloy with one or more of these metals, or steel.

14. The method as claimed in claim 1, wherein the projections on the first base region comprise aluminum, magnesium, titanium, or steel.

15. The method as claimed in claim 1, wherein the first metallic material is the same as the second metallic material.

16. The method as claimed in claim 1, wherein the projections provided on the first base region are formed integrally with the first base region.

17. The method as claimed in claim 1, wherein the projections are only in regions in which the first section is connected to the second section.

18. The method as claimed in claim 1, wherein the projections are projection ribs.

* * * * *